United States Patent [19]

Kitamura et al.

[11] Patent Number: 5,784,227
[45] Date of Patent: Jul. 21, 1998

[54] TAPE CASSETTE MOUNTED WITH IC MEMORY PACKAGE AND IC CONNECTING SYSTEM FOR THE TAPE CASSETTE

[75] Inventors: Hiroyuki Kitamura; Masato Mihara, both of Hiratsuka; Kouji Suzuki, Yokohama, all of Japan

[73] Assignee: Victor Company of Japan, Ltd., Yokohama, Japan

[21] Appl. No.: 912,014

[22] Filed: Aug. 15, 1997

Related U.S. Application Data

[63] Continuation of Ser. No. 635,238, Apr. 12, 1996, abandoned, which is a continuation of Ser. No. 227,027, Apr. 13, 1994, abandoned.

[30] Foreign Application Priority Data

| Apr. 14, 1993 | [JP] | Japan | 5-024669 |
| Apr. 23, 1993 | [JP] | Japan | 5-120910 |
| Apr. 28, 1993 | [JP] | Japan | 5-125156 |
| Apr. 28, 1993 | [JP] | Japan | 5-125157 |
| Jun. 28, 1993 | [JP] | Japan | 5-182043 |
| Jun. 30, 1993 | [JP] | Japan | 5-187602 |

[51] Int. Cl.⁶ .................... G11B 15/04; G11B 23/40
[52] U.S. Cl. .................................................. 360/132
[58] Field of Search .......................... 360/132, 137, 360/133

[56] References Cited

U.S. PATENT DOCUMENTS

| 4,338,644 | 7/1982 | Starr | 360/132 |
| 4,426,684 | 1/1984 | Sechet et al. | 364/900 |
| 4,814,924 | 3/1989 | Ozeki | 360/133 |
| 4,839,875 | 6/1989 | Kuriyama et al. | 369/14 |
| 5,291,346 | 3/1994 | Baekgaard | 360/60 |

FOREIGN PATENT DOCUMENTS

| 879620 | 2/1980 | Belgium . | |
| 0476445 | 3/1992 | European Pat. Off. . | |
| 58-189883 | 11/1983 | Japan | 360/132 |
| 60-15880 | 1/1985 | Japan | 360/133 |
| 60-171685 | 9/1985 | Japan . | |
| 62-73479 | 4/1987 | Japan . | |
| 61-156562 | 1/1988 | Japan | 360/132 |
| 63-48677 | 3/1988 | Japan | 360/133 |
| 63-71993 | 4/1988 | Japan | 360/133 |
| 62-40735 | 8/1988 | Japan | 360/133 |
| 63-291282 | 11/1988 | Japan | 360/133 |
| 2-41590 | 2/1990 | Japan | 360/132 |
| 2-96958 | 4/1990 | Japan . | |
| 5-61880 | 8/1993 | Japan . | |
| 9102355 | 2/1991 | WIPO . | |

*Primary Examiner*—Stuart S. Levy
*Assistant Examiner*—Brian E Miller
*Attorney, Agent, or Firm*—Michael N. Meller

[57] ABSTRACT

The present invention discloses a tape cassette mounted with an IC memory and an IC connecting system provided in a recording and reproducing apparatus for the tape cassette. The tape cassette is provided with a recess on the back side of the cassette. The recess has at least a round corner at a distal end thereof. The IC memory package has a rectangular shape with at least a round corner and with a cutout portion at a corner other than the round corner and a terminal portion on the package, wherein the IC memory package is mounted in the recess by causing the round corner of the IC memory package to be snugly fitted with the round corner of the recess. The connecting system is used for electrically connecting the terminals of the IC memory to the apparatus when the tape cassette is loaded into the apparatus. The IC connecting system has a connector including electrically conductive pressure contact members having one end for connecting the terminals of the IC memory under pressure and the other end connected to an IC drive circuit in the apparatus. The IC connecting system also automatically controls the connecting operation so as to obtain a reliable connection between the terminals of the IC memory and the contact member.

4 Claims, 13 Drawing Sheets

TAPE CASSETTE MOUNTED WITH IC MEMORY PACKAGE AND IC CONNECTING SYSTEM FOR THE TAPE CASSETTE

This application is a continuation of application Ser. No. 08/635,238, filed Apr. 12, 1996, now abandoned, which is a continuation of No. 08/227,027, filed Apr. 13, 1994, now abandoned.

BACKGROUND OF THE INVENTION

1. Field of the Invention

The present invention relates to a tape cassette for use with a magnetic cassette tape recording and/or reproducing apparatus, in particular, relates to a tape cassette mounted with an IC memory package and an IC connecting device and system for electrically connecting an IC memory built in the IC memory package to the magnetic cassette tape recording and/or reproducing apparatus.

2. Description of the Related Art

Generally, a tape cassette to be used with a magnetic recording and/or reproducing apparatus such as a video tape recorder comprises a housing, a pair of reels having a magnetic tape being wound and rotatably provided in the housing and a detecting portion provided at a back side of the housing for preventing the magnetic tape from being erroneously erased. Further close to the detecting portion at the back side thereof, there is provided a recess, and a label on which a title and contents of recorded programs of the magnetic tape are written with characters, is adhered in the recess for indicating the recorded contents at a glance without reproducing the magnetic tape.

This kind of tape cassette is widely used as a domestic use, wherein the tape cassette is repeatedly used by causing the recorded contents of the magnetic tape to be erased except for a case where an everlasting preservation of the recorded contents is intended.

When the recorded contents of the magnetic tape are erased and new contents are again recorded in the magnetic tape, the label has to be replaced with a new one, which poses an inconvenience in making use of the tape cassette.

In addition, with remarkable advance of the magnetic tape, a long time recording has been realized on the magnetic tape, which causes a problem that all the recorded contents thereof can not be sufficiently described on the label.

SUMMARY OF THE INVENTION

Accordingly, a general object of the present invention is to provide a novel and useful tape cassette in which the above disadvantage has been eliminated.

A more specific object of the present invention is to provide a tape cassette having a housing, a pair of reels rotatably provided in the housing for winding a magnetic tape on said pair of reels and a preventing means provided at a back of the housing for preventing the magnetic tape from being erroneously erased, the tape cassette comprising, a recess formed at a position nearby the preventing means on the back of the housing, the recess defining approximately a rectangular shape formed with at least round corners at a distal end thereof, and an IC memory package having an IC memory built therein, the IC memory package comprising a package having an approximately rectangular shape with round corners and with a cutout portion formed at a corner other than the round corners for representing an installed state of the IC memory package when the IC memory package is mounted in the recess, and a terminal portion provided on a surface of the package, wherein the IC memory package is mounted in the recess by causing the round corners of the IC memory package to be snugly fitted with the round corners of the recess.

Another specific object of the present invention is to provide a tape cassette having a housing a pair of reels rotatably provided in the housing for winding a magnetic tape on said pair of reels and a preventing means provided at a back of the housing for preventing the magnetic tape from being erroneously erased, the tape cassette comprising, a recess formed at a position nearby the preventing means on the back of the housing, a first marker provided on the back of the housing nearby the recess, and an IC memory package having an IC memory built therein, the IC memory package comprising a package having an approximately rectangular shape, a terminal portion provided on a surface of the package and a second marker provided on the surface in a position other than the terminal portion, wherein the IC memory package is mounted in the recess by causing the second marker of the IC memory package to face the first marker of the housing to each other.

Another specific object of the present invention is provide a tape cassette having a housing, a pair of reels rotatably provided in the housing for winding a magnetic tape on said pair of reels and a preventing means provided at a back side of the housing for preventing the magnetic tape from being erroneously erased, the tape cassette comprising, a recess formed at a position nearby the detecting means on the back side of the housing, and an IC memory package having an IC memory built therein being mounted in the recess, the IC memory package comprising a package having an approximately rectangular shape, a marker provided at a corner portion on a surface of the package for representing an installed state of the IC memory package when the IC memory package is mounted in a predetermined position of the recess and a terminal portion having a first array of terminals which contact a second array of terminals provided on a tape cassette recording and reproducing apparatus when the tape cassette is loaded into the apparatus, the first array of terminals including a ground for the IC memory, the second array of terminals including a power source terminal for supplying a power source to the IC memory, wherein the power source terminals is located at a predetermined position in the apparatus and the first array of terminals is laid out that the ground terminal is so located as not to contact the power source terminal when the IC memory package is mounted in wrong orientation in the predetermined position of the recess.

Another specific object of the present invention is to provide an IC memory package having an IC memory built therein, for being mounted at a predetermined position of a a recess provided at a rear surface on a tape cassette comprising a package having a rectangular shape, a cutout portion formed at a first corner of the package for representing an installed state of the IC memory package, a round corner provided at a second corner of the package other than the first corner provided with the cut out portion.

Another specific object of the present invention is provide an IC connecting system provided in a recording and reproducing apparatus operating with a recording medium housing mounted with an IC memory package embeded with an IC memory element for storing information related to a program to be recorded on the recording medium, the IC memory package provided with connecting terminals, whereby when the recording medium housing is loaded in a predetermined loaded position within the recording and reproducing apparatus, the connecting terminals of the IC memory package are electrically connected to the recording and reproducing apparatus, said IC connecting system comprising, connector means provided in a vicinity of the predetermined loaded position, said connector means including a plurality of electrically conductive pressure contact members having first ends for making a pressure contact with a plurality of said connecting terminals of the IC memory and having second ends connected to an IC drive circuit provided within the recording and reproducing apparatus for driving the IC memory.

DETAILED DESCRIPTION OF THE PREFERRED EMBODIMENTS

A tape cassette mounted with an IC memory package and an IC connecting device according to the present invention will be described in connection with the embodiments thereof with reference to FIGS. 1–16 and FIGS. 17–23 respectively.

The IC connecting device is installed in a cassette tape recording and/or reproducing apparatus for electrically connecting an IC memory built in the IC memory package to electronic device of the cassette tape recording and/or reproducing apparatus by causing a terminal portion of the IC connecting device to contact with a terminal portion of the IC memory package.

At first, a description is given to embodiments of tape cassettes mounted with IC memory packages according to the present invention.

A first embodiment of a tape cassette 110 mounted with a first embodiment of an IC memory package 105

Figure 1:
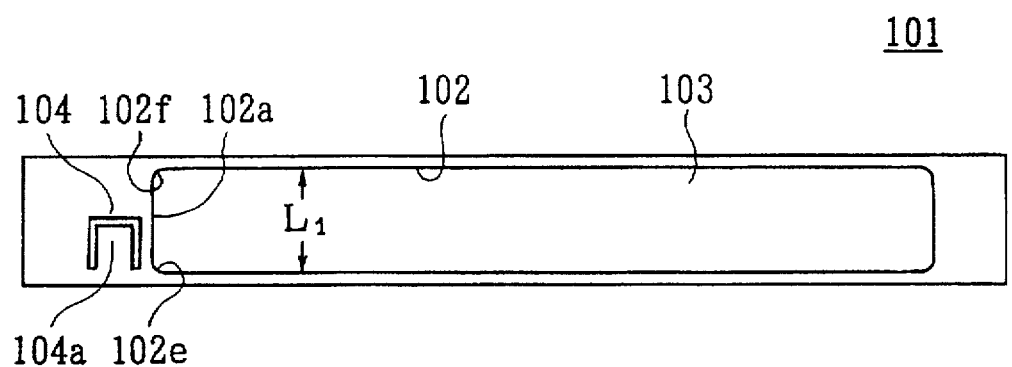
FIG. 1 is a rear view showing a tape cassette housing, for instance, used for a VHS-type (an industrial standard) tape cassette in which a pair of reels (not shown) are rotatably provided.

FIG. 1 is a rear view showing a tape cassette housing, for instance, used for a VHS-type (an industrial standard) tape cassette in which a pair of reels (not shown) are rotatably provided.

Figure 2:
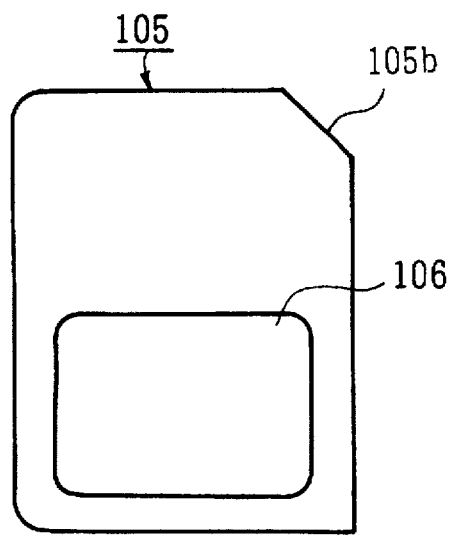
FIG. 2 is a plane view showing a first embodiment of an IC memory package according to the present invention.
Figure 3:
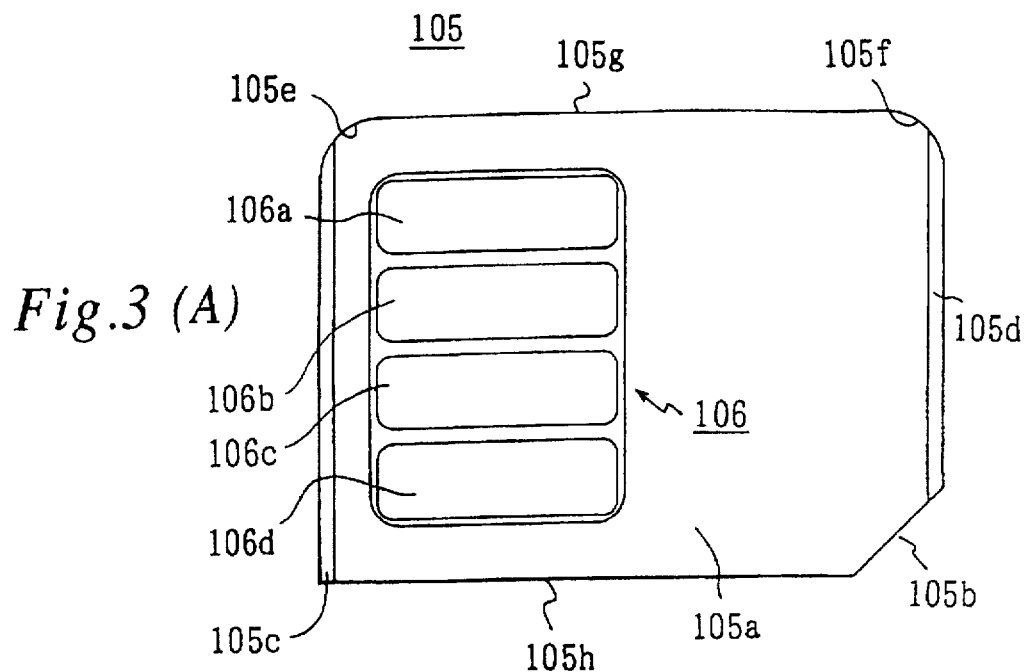
FIG. 3(A) is a more detailed plan view of the IC memory package shown in FIG. 2.
FIG. 3(B) is a side view of the IC memory package shown in FIG. 3(A).
FIG. 3(C) is a bottom plan view of the IC memory package shown in FIG. 3(A).
Figure 3:
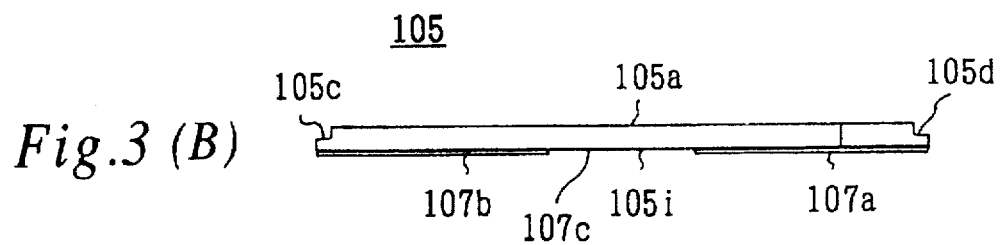
Figure 3:
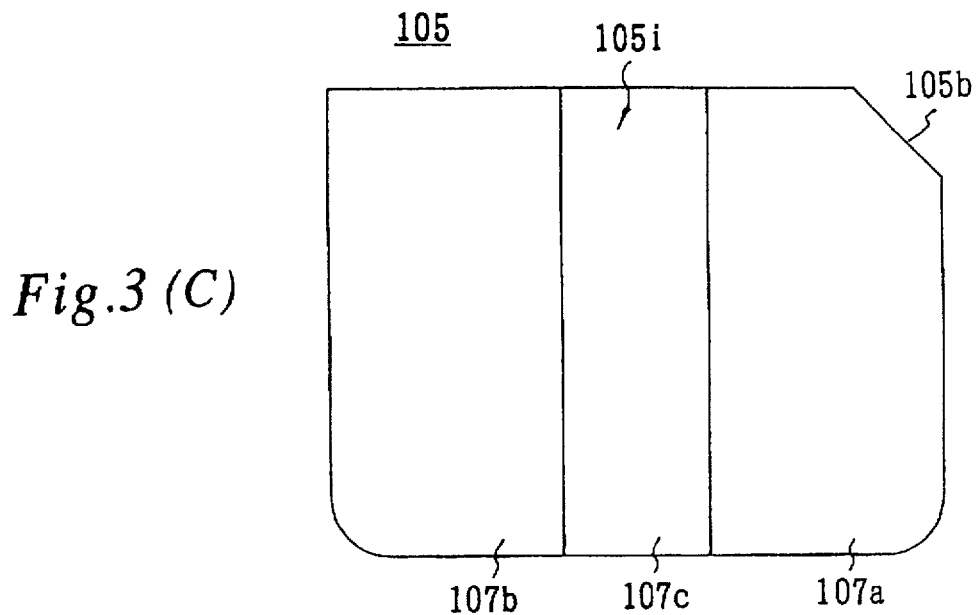

FIG. 2 is a plan view showing a first embodiment of an IC memory package according to the present invention.

FIG. 3(A) is a more detailed plan view of the IC memory package shown in FIG. 3(A), FIG. 3(B) is a side view of the IC memory package shown in FIG. 3(A) and FIG. 3(C) is a bottom plan view of the IC memory package shown in FIG. 2.

Figure 4:
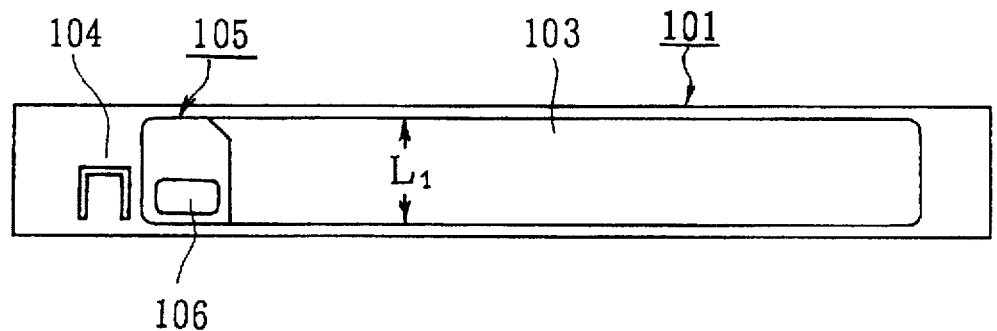
FIG. 4 is a rear view showing a first embodiment of a tape cassette mounted with the first embodiment of the IC memory package according to the present invention.

FIG. 4 is a rear view showing a first embodiment of a tape cassette mounted with the first embodiment of the IC memory package according to the present invention.

Referring to FIG. 1, a reference character 101 designates a tape cassette housing made of an upper half and a lower half (not shown) employed in the present invention, 102 a recess having a width of L1 extending to approximately a full height of the cassette housing 101. The recess 102 has a rectangular configuration to allow a label 103 indicative of recorded content to be attached within the recess 102, and has at least 2 round corners 102e, 102f among all the 4 corners in a position next to a detecting part 104. The detecting part 104 is provided on a rear of the tape cassette housing 101 for preventing erroneous erase of a recorded program content. As well known, it is possible for the magnetic tape accommodated in the tape cassette housing 101 to be recorded in the tape cassette recording apparatus when a tab 104a of the detecting part 104 is present, and impossible when the tab 104a is removed therefrom.

Referring to FIGS. 2 and 3(A), a reference character 105 designates a first embodiment of an IC memory package according to the present invention.

The IC memory package 105 generally comprising an IC memory (not shown) and a package for accommodating the IC memory. The package is made of resin having approximately a rectangular configuration. The IC memory package 105 further comprises an upper surface 105a, a terminal portion 106 (106a–106d) provided on a lower half portion of the upper surface 105a, a bottom surface 105i and pressure sensitive adhesives 107a, 107b provided on a lower half portion of the bottom surface 105i.

A reference character 105b designates a position discrimination part having a slant portion provided at an upper right-hand corner oriented bottom right in FIG. 3(A) for identifying an installed state of the IC memory package 105 in the recess 102. 105c and 105d designate step portions each provided at a lower and an upper distal end of the IC memory package 105. Reference characters 105e and 105f designate round corners each provided at a lower and an upper left-hand corner which are formed so as to be fitted to the round corners 102e, 102f of the recess 102. Reference characters 105g and 105h respectively designate a left-hand side of the IC memory package 105 defined between the round corners 105e, 105f thereof and a right-hand side defined between the position discrimination part 105b and the step portion 105c. The terminal portion 106 has 4 terminals 106a–106d disposed in a low at an equivalent interval as shown in FIG. 3(A). For instance, the terminal 106a is used for a first control signal, 106b for a power source, 106c for a second control signal and 106d for a ground and these terminals 106a–106d are all connected to terminals of an IC connecting device provided in the tape cassette recording and/or reproducing apparatus (not shown) as described thereafter.

Next, referring to FIGS. 3(B) and 3(C), a description is given to a construction of the bottom surface 105i of the IC memory package 105.

The pressure sensitive adhesives 107a, 107b are (right and left in FIG. 3(B)) respectively provided on an upper portion and a lower portion of the bottom surface 105i thereof interleaving a middle space 107c where the pressure sensitive adhesive is not to be provided. As mentioned in the foregoing, this type of cassette is assembled by causing the upper and lower cassette halves to be coupled together, thus it is difficult to assemble them precisely without a step made at a joint thereof because of difficulty to obtain an accurate metal mold. Therefore, the middle space 107c is provided between the pressure sensitive adhesives 107a, 107b to avoid poor adherence due to possible uneven abutment of the upper and lower halves so that the IC memory package 105 is securely adhered on the recess 102 of the cassette 101 as mentioned hereafter.

In addition, the terminal portion 106 is embedded within the IC memory package 105 so as to be flush with the upper surface 105a of the IC memory package 105.

As shown in FIG. 4, the IC memory package 105 is provided in the recess 102 of the tape cassette 101 (the VHS type), naturally the configuration of the IC memory package 105 is made smaller than the periphery of the recess 102.

Further, a thickness of the IC memory package 105 is made slightly larger than a depth of the recess 102 so as to allow the IC memory to be connected with terminals of the tape cassette recording and/or reproducing apparatus when the tape cassette 110 is mounted in the apparatus.

The step portions 105c, 105d have a height approximately a half of the thickness of the IC memory package 105, which is smaller than the depth of the recess 102.

As mentioned in the foregoing, the package of the IC memory package 105 is made of resin on which colors or characters can be painted or printed, that allow the IC memory package 105 itself to carry information for discrimination.

Next, a description is given to an assembly of the IC memory package 105 to the recess 102 of the tape cassette housing 101, referring to FIGS. 1 and 4.

The IC memory package 105 is securely adhered to the recess 102 by causing the slant portion of position discrimination part 105b to be positioned upwardly and the round corners 105e, 105f provided at the left-hand side thereof to be fitted with the round corners 102e, 102f of the recess 102.

Thus, it will be understood that the IC memory package 105 is securely installed in a predetermined position of the recess 102 because of the provision of round corners 105e, 105f and the position discrimination part 105b of the IC memory package 105 together with the same round corners 102e, 102f of the recess 102 as that of the IC memory package 105, which ensures the electrical connection of the terminals 106a–106d of the IC memory package 105 to the terminals of the IC connecting device of the apparatus as described thereafter.

Further, if the IC memory package was installed in a wrong state, i.e., upside down, in the recess 102, the terminals 106a–106b would not be connected to terminals of the aforementioned IC connecting device (not shown) provided in the tape cassette recording and/or reproducing device because the terminals 106a–106d are displaced upward from a standard position, this prevents the IC memory from being electrically destroyed.

Further, it should be noted that the pressure sensitive adhesives 107a, 107b facilitate the installation of the IC memory package 105 because they require no additional adhesive means. Thus, users can easily attach the IC memory package at a predetermined position of the recess.

A second embodiment of a tape cassette 120 mounted with a first embodiment of an IC memory package 105

Figure 5:
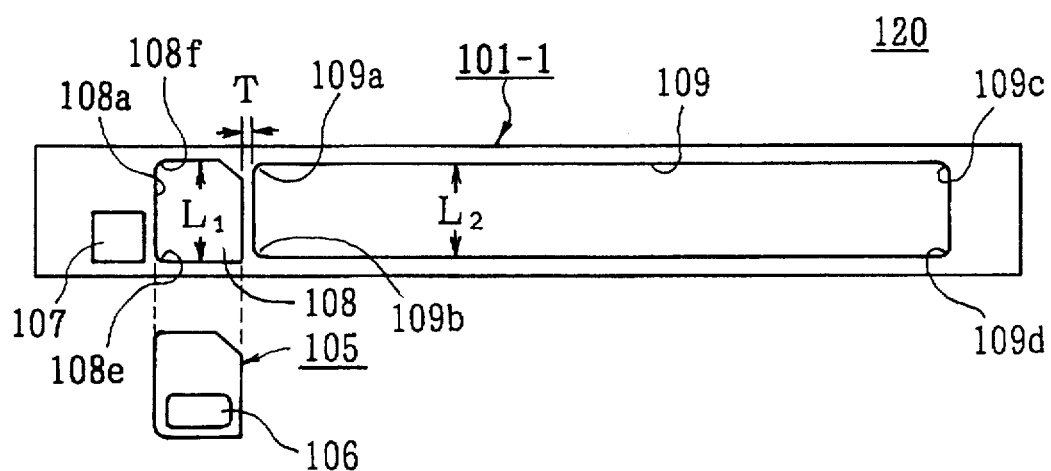
FIG. 5 is a rear view showing a second embodiment of a tape cassette having a high quality magnetic tape with the first embodiment of the IC memory package of the present invention.

FIG. 5 is a rear view showing a second embodiment of a tape cassette having a high quality magnetic tape with the first embodiment of the IC memory package of the present invention, wherein the same components as those described are designated with common reference characters, and their detailed descriptions are omitted for convenience of description.

Referring to FIG. 5, in the second embodiment of the tape cassette 120 with the IC memory package 105, another tape cassette housing 101-1 accommodated with a high quality magnetic tape is employed, wherein a detecting cutout 107 is provided at the same position as that of the detecting part 104 for preventing an erroneous erase of the recorded program content as shown in FIGS. 1 and 4. This cutout 107 prevents the high quality magnetic tape from being recorded by being detected with a detecting device (not shown) provided in the apparatus, when the tape cassette 120 is mounted in the apparatus.

Further, an IC package recess 108 for accommodating the first embodiment of the IC memory package 105 is formed on the side of the tape cassette housing 101-1 in such a position that a distal end 108a thereof accords with the distal end 102a of the recess 102 shown in FIG. 1.

The IC package recess 108 is formed so as to have approximately the similar shape as that of the IC memory package 105 by providing at least two round corners 108e, 108f and a slant which corresponds to the position discrimination part 105b. The overall size of the IC package recess 108 is made slightly larger than that of the IC memory package 105 to allow the IC memory package 105 to be snugly fitted to the IC package recess 108. Further, a length L1 of the IC package recess 108 is made slightly larger than a width L2 of a labeling recess 109. Further, the labeling recess 109 is formed next to the IC package recess 108 between which a space having length T is interposed, and has a rectangular configuration formed with 4 round corners 109a, 109b, 109c and 109d.

Next, a description is given to an assembly of the IC memory package 105 to the IC package recess 108 of the tape cassette 101-1, referring to FIG. 5.

The IC memory package 105 is securely adhered to the IC package recess 108 by causing the slant portion of position discrimination part 105b to be fitted with the slant thereof and the round corners 105e, 105f of the IC memory package 105 to be fitted with the round corners 108e, 108f thereof.

Thus, it will be understood that the IC memory package 105 is securely installed in the IC package recess 108 because of the provision of round corners 105e, 105f and the position discrimination part 105b of the IC memory package 105 made corresponding with the slant and the round corners 108e, 108f of the IC package recess 108, this ensures the electrical connection of the terminals 106a–106d of the IC memory package 105 to the terminals of the IC connecting device provided in the apparatus as described thereafter.

A third embodiment of a tape cassette 130 mounted with a second embodiment of an IC memory package 105-1

Figure 6:
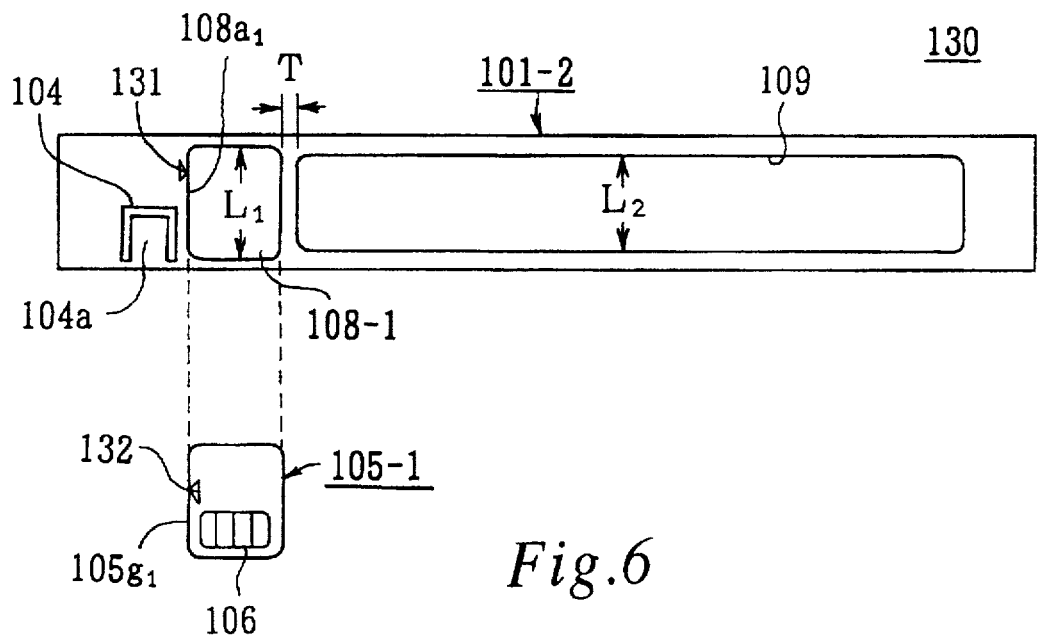
FIG. 6 is a rear view showing a third embodiment of tape cassette with a second embodiment of an IC memory package of the present invention.

FIG. 6 is a rear view showing a third embodiment of tape cassette with a second embodiment of an IC memory package of the present invention, wherein the same components as those described are designated with common reference characters.

The second embodiment of the IC memory package 105-1 has the same construction as that of the first embodiment of the IC memory package 105 except for an external configuration and a provision of a discrimination marker 132 having, for instance, a triangle configuration at a distal end of the left-hand side of the IC memory package 105-1. The IC memory package 105-1 has 4-round corners and has no slant portion at the corners.

A tape cassette housing 101-2 has the same configuration as that of the tape cassette housing 101-1 except for the shape of the cutout 107 and the IC package recess 108.

In this embodiment, the tape cassette housing 101-2 has the same detecting part 104 as that of the tape cassette housing 101, and an IC package recess 108-1 for installing the IC memory package 105-1 is provided so as to have approximately the same round corners as those of the IC memory package 105-1.

Further, a cassette discrimination marker 131 is provided at a position nearby the distal end of the IC package recess 108-1 and above the detecting part 104 in the tape cassette housing 101-2 so as to oppose the discrimination mark 132 of the IC memory package 105-1 when the IC memory package 105-1 is installed therein, this allows a secure installation of the IC memory package 105-1 in the IC package recess 108-1.

A fourth embodiment of a tape cassette 140 mounted with a second embodiment of an IC memory package 105-1

Figure 7:
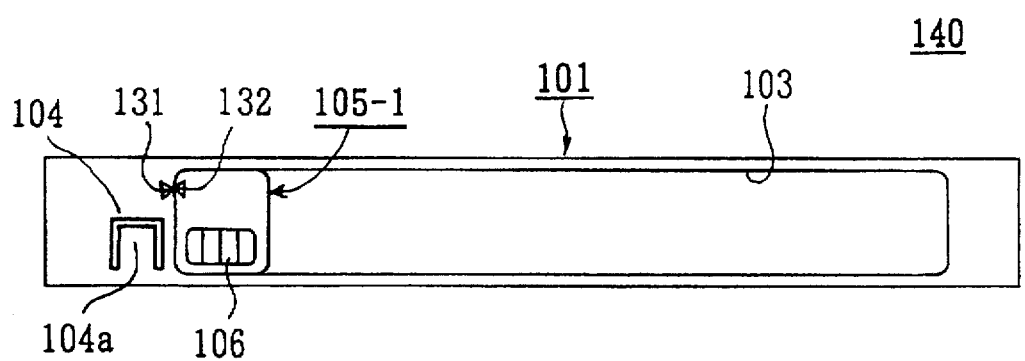
FIG. 7 is a rear view showing a fourth embodiment of tape cassette mounted with the second embodiment of an IC memory package of the present invention.

FIG. 7 is a side view showing a fourth embodiment of tape cassette with a second embodiment of an IC memory package of the present invention, wherein the same components as those described are designated with common reference characters.

Referring to FIG. 7, in this embodiment, the second embodiment of the IC memory package 105-1 as shown in FIG. 6 and the tape cassette housing 101 as shown in FIG. 1 are employed together with the cassette discrimination marker 131 as shown in FIG. 6.

The assembly and the advantage thereof are the same as those of the third embodiment, thus the detailed description is omitted here for simplicity.

A fifth embodiment of a tape cassette 150 mounted with a third embodiment of an IC memory package 105-2

Figure 8:
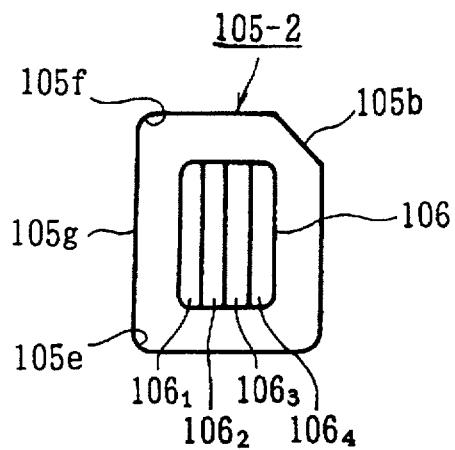
FIG. 8 is a plan view showing a third embodiment of an IC memory package of the present invention.
Figure 9:
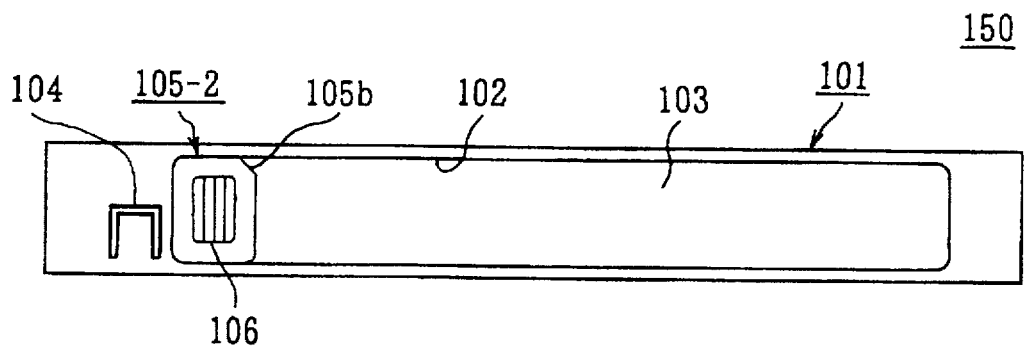
FIG. 9 is a fifth embodiment of a tape cassette mounted with the third embodiment of an IC memory package of the present invention, wherein the third embodiment of the IC memory package is installed in a correct state.
Figure 10:
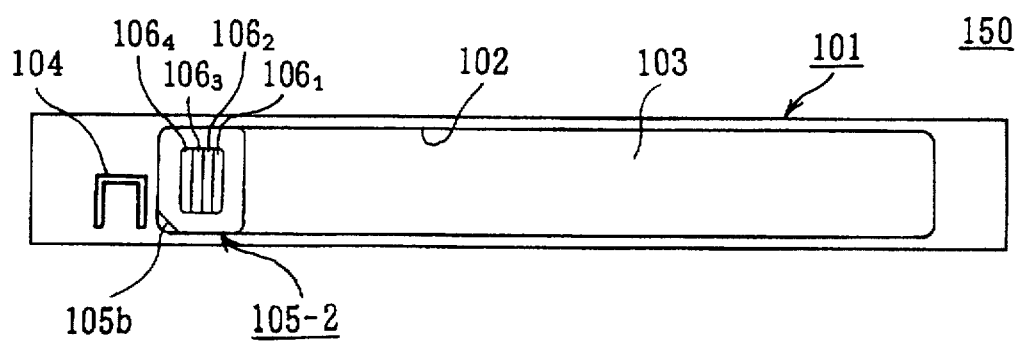
FIG. 10 is a rear view showing a fifth embodiment of a tape cassette where the third embodiment of the IC memory package is installed in a wrong direction.
Figure 11:
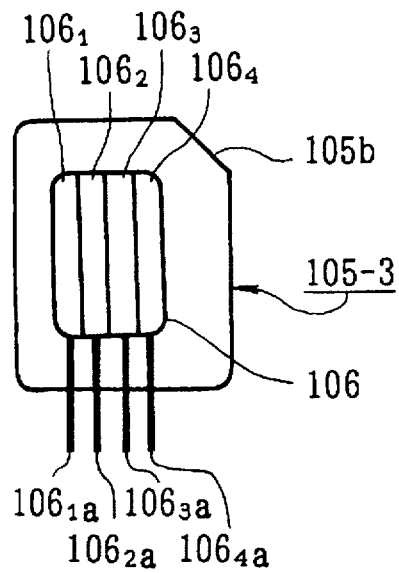
FIG. 11(A) is a plan view showing a fourth embodiment of an IC memory package of the present invention, wherein terminals of the IC memory package are connected in a normal state with terminals of an IC connecting device.
FIG. 11(B) is a plan view showing a fourth embodiment of an IC memory package of the present invention, wherein terminals of the IC memory package are mounted offset from proper terminals of an IC connecting device.
Figure 11:
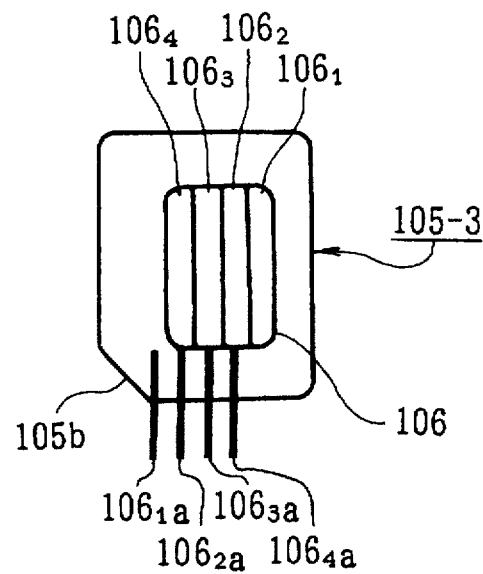

FIG. 8 is a plan view showing a third embodiment of an IC memory package of the present invention and FIG. 9 is a fifth embodiment of a tape cassette mounted with a third embodiment of an IC memory package of the present invention, and FIG. 10 is a rear view showing a fifth embodiment of a tape cassette, wherein the third embodiment of the IC memory package is installed in a wrong orientation. In these drawings, the same components as those described are designated with common reference characters.

Referring to FIG. 8, the third embodiment of the IC memory package 105-2 has the same configuration as that of the first embodiment of the IC memory package 105 shown in FIGS. 3(A)–3(B) except for that the IC memory package has the 3 round corners and a position of the terminal portion 106 which is disposed approximately at a vertical center of the IC memory package 105-2. Further, the terminal portion 106 has 4 terminals $106_1$–$106_4$, wherein the terminal $106_1$ is provided for a second control signal, $106_2$ for a power supply, $106_3$ for a first control signal and $106_4$ for a ground as mentioned in the first embodiment of the IC memory package 105.

This IC memory package 105-2 is provided in the recess 102 of the tape cassette housing 101 shown in FIG. 1 in the same manner as mentioned in the foregoing.

Next, a description is given to the advantage of the above mentioned embodiment.

When the tape cassette 150 is mounted in the tape cassette recording and/or reproducing apparatus, each of the terminals $106_1$–$106_4$ of the IC memory package 106 is electrically connected to each of corresponding terminals of the IC connecting device provided in the apparatus (not shown) as mentioned hereafter. Thus, the information of the recorded content material on the magnetic tape is stored in the IC memory by using a pen input device, a character input device and the like which are provided in the apparatus.

Needless to say, the information of the recorded material can also be stored in the IC memory thereof by using an external device such as a personal computer.

When the IC memory package 105-2 is precisely installed in the recess 102 of the tape cassette housing 101 shown in FIG. 9, no problem occurs upon connecting of the terminals $106_1$–$106_4$ with the terminals of the connecting device provided in the apparatus.

The advantage of this embodiment is that the IC memory built in the IC memory package 105-2 is not electrically destroyed even when the IC memory 105-2 is erroneously installed as shown in FIG. 10, wherein the IC memory packaged 105-2 is installed upside down in the recess 102 of the tape cassette housing 101. The reason is as follows:

The position of the terminal $106_1$ for the second control signal is replaced with the position of the terminal $106_4$ for the ground, when the IC memory package 105-2 is installed upside down as shown in the FIG. 10. Thus, the terminal $106_1$ for the second control signal is connected with the terminal for ground of the IC connecting device provided in the apparatus.

In the same way, the terminal $106_2$ for the power source is connected to the terminal for the first control signal of the IC connecting device, the terminal $106_3$ for the first control signal is connected to that for the power source thereof, and the terminal $106_4$ for the ground is connected to that for the second control signal thereof, respectively.

However, in this case, the IC memory is provided with a reversal voltage which is not high enough to damage the IC memory, thus the IC memory is prevented from being electrically destroyed.

A fourth embodiment of an IC memory package 105-3

FIG. 11(A) is a plan view showing a fourth embodiment of an IC memory package of the present invention, wherein the terminals of the IC memory package is connected to the terminals of IC connecting device of the apparatus in a normal state, and FIG. 11(B) is a plan view showing a fourth embodiment of an IC memory package of the present invention, wherein terminals of the IC memory package is connected in a wrong direction to the terminals of an IC connecting device. In these drawings, the same components as those described before are designated with common reference characters.

Referring to FIG. 11(A), a fourth embodiment of an IC memory package 105-3 has the same configuration as that of the third embodiment of the IC memory package 105-2 shown in FIG. 8 except for that a position of the terminal portion 106 of which a center line is displaced slightly leftward. The terminal portion 106 has 4 terminals $106_1$–$106_4$, wherein the terminal $106_1$ is provided for a power source, $106_2$ for a second control signal, $106_3$ for a ground and $106_4$ for a first control signal.

The IC memory package 105-3 is adhered, for instance, in the recess 102 of the tape cassette housing 101 shown in FIG. 1.

Reference characters $106_1$a–$106_4$a designate corresponding terminals provided in the IC connecting device of the tape cassette recording and/or reproducing apparatus as described hereafter. Upon mounting the tape cassette on the apparatus, the terminals $106_1$–$106_4$ of the IC memory package 105-3 are respectively connected to the corresponding terminals $106_1$a–$106_4$a when the IC memory package 105-3 is adhered in a normal state in the recess 102 of the tape cassette housing 101 as described in the foregoing.

However, when the IC memory package 105-3 is erroneously adhered in the recess 102 of the tape cassette housing 101, for instance, upside down, the terminal portion 106 is displaced rightward compared with that in the normal state. Thus, as shown in FIG. 11(B), upon mounting the tape cassette in the apparatus, some of the terminals $106_1$–$106_4$ of the IC memory package 105-3 are disorderly connected to some of the terminals $106_1$a–$106_4$a of the IC connecting device, and some of the terminals $106_1$a–$106_4$a, i.e., in this case the terminal $106_1$a for the power source, are not connected to the terminals $106_1$–$106_4$.

Therefore, the IC memory package 105-3 is prevented from being supplied with a voltage other than that of the power source.

Thus, it will be understood that this embodiment prevents the IC memory package 105-3 from being electrically destroyed even when it is erroneously installed in the recess 102 of the tape cassette housing 101, in other words, the IC memory package 105-3 is protected from an electrical destruction when it is attempted to operate.

A sixth embodiment of a tape cassette 160 mounted with a fifth embodiment of an IC memory package 105-4

Figure 12:
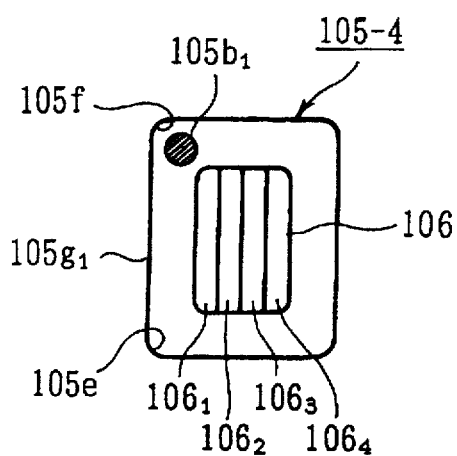
FIG. 12 is a plan view showing a fifth embodiment of an IC memory package according to the present invention.
Figure 13:
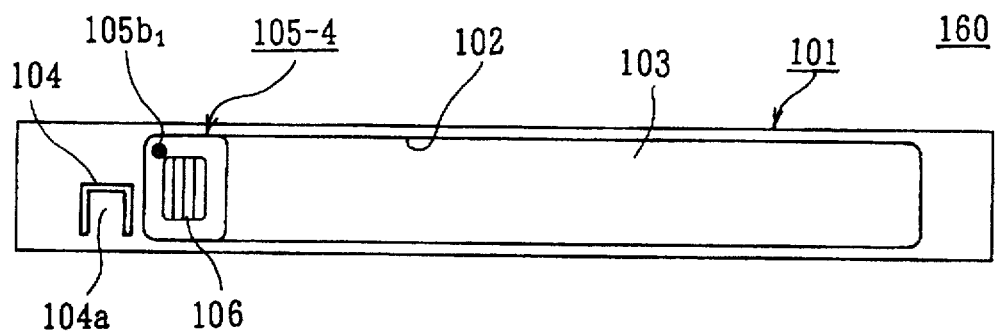
FIG. 13 is a rear view showing a sixth embodiment of a tape cassette mounted with the fifth embodiment of the IC memory package, wherein the fifth embodiment of the IC memory package is installed in a correct state.
Figure 14:
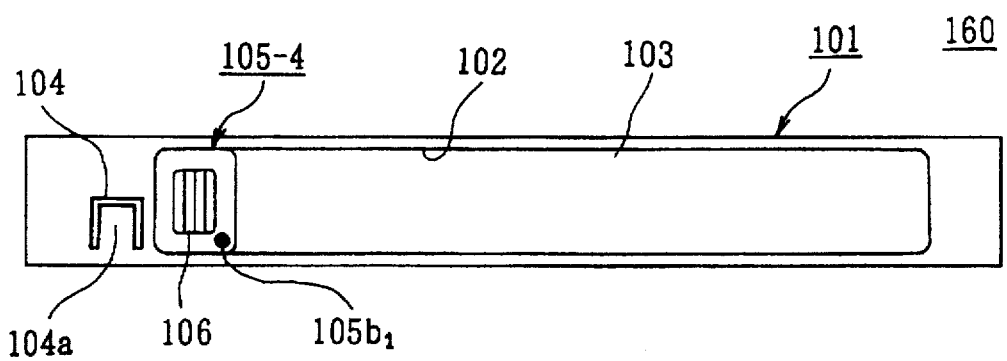
FIG. 14 is a rear view showing a sixth embodiment of a tape cassette mounted with the fifth embodiment of the IC memory package, wherein the fifth embodiment of the IC memory package is installed in a wrong direction.

FIG. 12 is a plan view showing a fifth embodiment of an IC memory package according to the present invention, FIG. 13 is a rear view showing a sixth embodiment of a tape cassette mounted with the fifth embodiment of the IC memory package, wherein the fifth embodiment of the IC memory package is installed in a normal state, and FIG. 14 is a rear view showing a sixth embodiment of a tape cassette, wherein the fifth embodiment of the IC memory package is installed in a wrong direction. In these drawings, the same components as those described before are designated with common reference characters.

An IC memory package 105-4 of this embodiment has the same configuration as that of the third embodiment of the IC memory package 105-3 shown in FIG. 8 except for the slant of the position discrimination part 105b. The IC memory package 105-4 has all four round corners and is provided with a round marker 105b1 at an upper left-hand portion as shown in FIG. 12. The IC memory package 105-4 is installed in the recess 102 of the tape cassette housing 101 so that the round maker 105b1 is positioned at the upper left-hand portion in a normal state as shown in FIG. 13.

Thus, it will be understood that this round maker 105b1 is useful to discriminate if the IC memory package 105-4 is installed in a normal state as shown in FIG. 13 or in a wrong state as shown in FIG. 14 in the recess 102.

A sixth embodiment of an IC memory package 105-5

Figure 15:
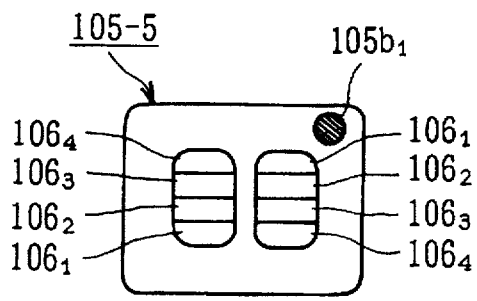
FIG. 15 is a plan view showing a sixth embodiment of an IC memory package according to the present invention.

FIG. 15 is a plan view showing a sixth embodiment of an IC memory package according to the present invention, wherein the same components as those described are designated with common reference characters.

An IC memory package 105-5 of this embodiment has the same configuration as that of the fifth embodiment of the IC memory package 105-4 shown in FIG. 12 except for the terminal portion 106.

Referring to FIG. 15, the IC memory package 105-5 of this embodiment is provided with a pair of groups each having required termina $106_1$–$106_4$. In addition, between the groups the terminals 1061–1064 and are disposed in such a manner that respective positions of the terminals $106_1$–$106_4$ each having the same reference character or a common internal connection are substantially and diagonally symmetrical each other with respect to a center of the IC memory package 105-5 having the rectangular configuration.

When the IC memory package 105-5 is installed in the recess 102 of the tape cassette housing 101 by causing the round marker 105b1 to be positioned at the upper left-hand portion, the one group of the terminals can be connected with the terminals of the IC connecting device of the apparatus.

In this embodiment, however, even when the IC memory package 105-5 is wrongly adhered in the recess 102, i.e., upside down, the other group set of terminals $106_1$–$106_4$ can be connected to the terminals of the IC connecting device correctly because the pair of the required terminals $106_1$–$106_4$ are provided in the symmetric disposition with respect to the center of the IC memory package 105-5.

A seventh embodiment of an IC memory package 105-6

Figure 16:
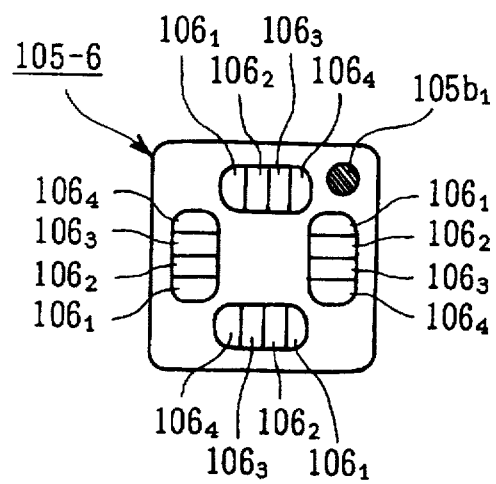
FIG. 16 is a plan view showing a seventh embodiment of an IC memory package according to the present invention.

FIG. 16 is a plan view showing a seventh embodiment of an IC memory package according to the present invention, wherein the same components as those described are designated with common reference characters.

Referring to FIG. 16, the IC memory package 105-6 of this embodiment has a square configuration having 4 round corners, and is provided with 4 groups of the required terminals $106_1$–$106_4$ in such a manner that between opposing groups, the respective terminals $106_1$–$106_4$ having common reference characters are disposed substantially and diagonally symmetrical with respect to a center of the IC memory package 105-6 to allow all the 4 group of required terminals to be connected correctly to the terminals of the connecting device irrespective of the adhered direction of the IC memory package 105-6 in the recess 102 of the tape cassette housing 101.

Thus, the IC memory built in the IC memory package 105-6 is prevented from being supplied with a wrong voltage from the power source, and is prevented from being electrically destroyed upon loading of the tape cassette 105-6 into the apparatus.

IC Connecting Device and IC Connecting System

Next, a description is given to an embodiment of an IC connecting device and an IC connecting system of the present invention.

It is well known that a tape cassette accommodating a magnetic tape in its casing or a disc case accommodating a disc in its casing, etc., is loaded from a loading and unloading position to a predetermined position in a recording and reproducing apparatus by means of a recording medium transporting means and the magnetic tape or the disc is recorded or reproduced in the predetermined position.

An apparatus used for recording and reproducing the magnetic tape is referred to as a magnetic recording and reproducing apparatus and an apparatus used for reproducing a disc is referred to as a disc reproducing apparatus.

In the present invention, the IC connecting device and the IC connecting system for controlling operation of reliable electrical connection to the apparatus are installed in recording and reproducing apparatuses such as the magnetic tape or the disc recording and reproducing apparatus, and recording medium accommodating housings such as the tape cassette or the disc case is applicable to the abovementioned apparatuses having the IC connecting device and the IC connecting system by mounting the IC memory packages on predetermined positions of the housings.

A description is given to an embodiment of the IC connecting device and the IC connecting system applied to the tape cassette mounted with the IC memory package with reference to FIGS. 17 to 23, however, it can also be applied to the disc case mounted with the IC memory package.

Figure 17:
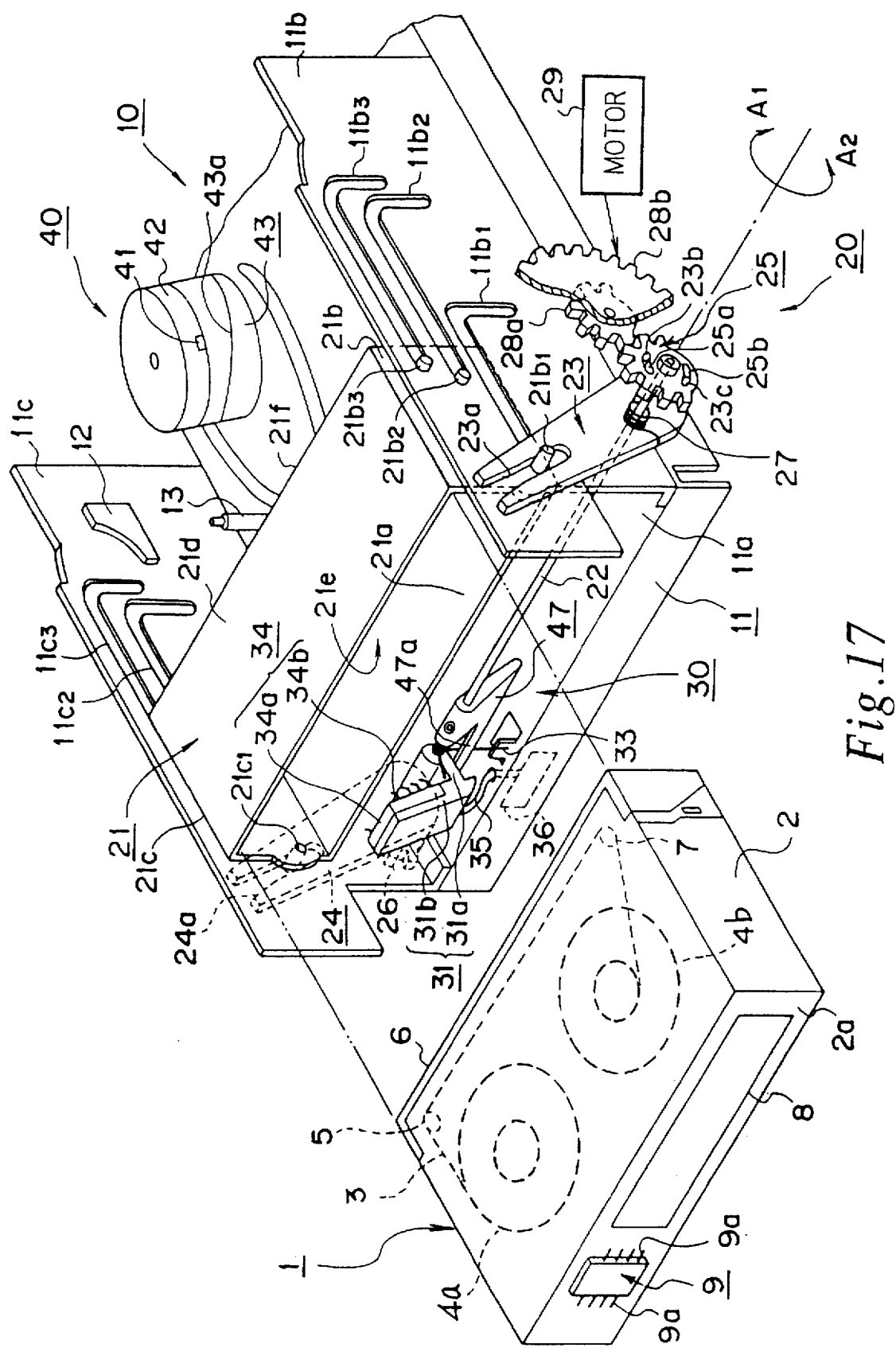
FIG. 17 is a perspective view showing an IC connecting device and system for a tape cassette mounted with an IC memory.
Figure 18:
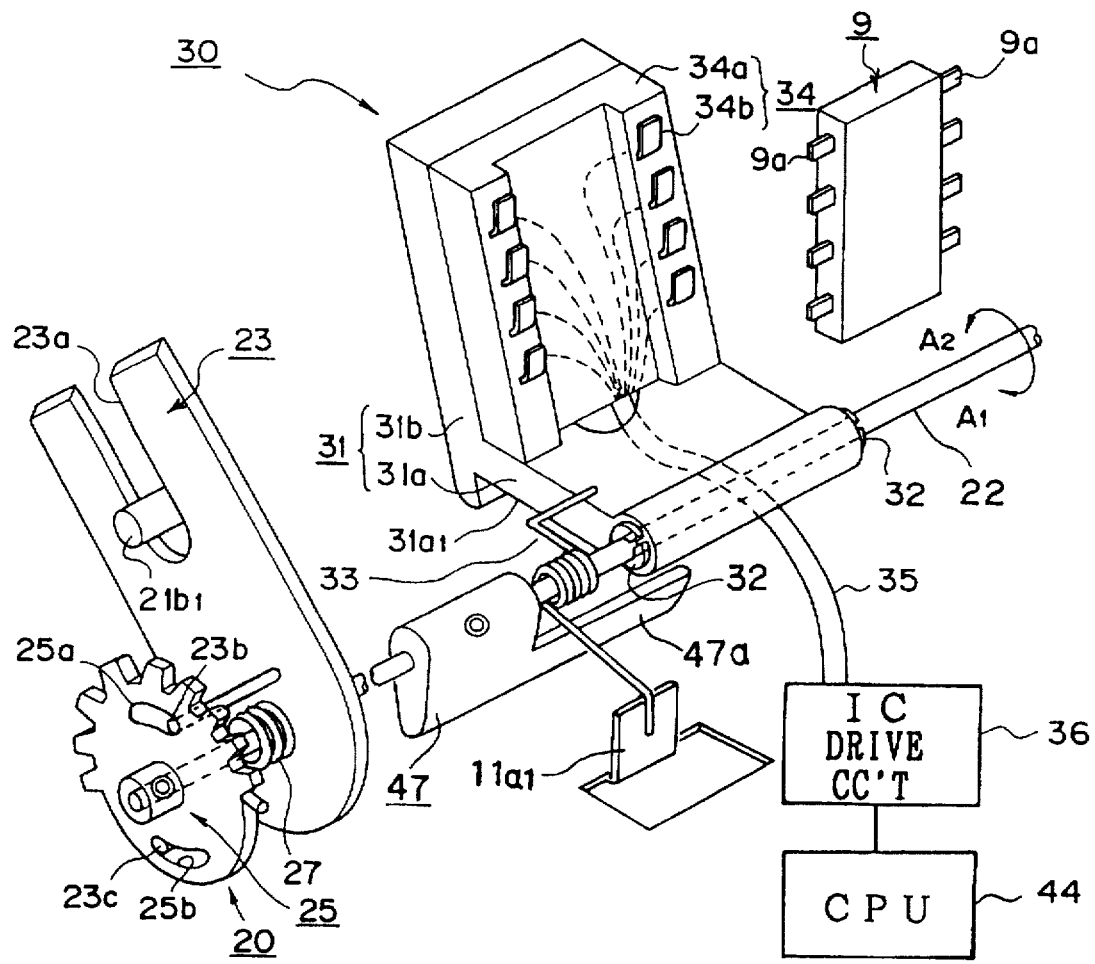
FIG. 18 is an enlarged perspective view showing a main portion of the IC connecting device and system shown in FIG. 17.
Figure 19:
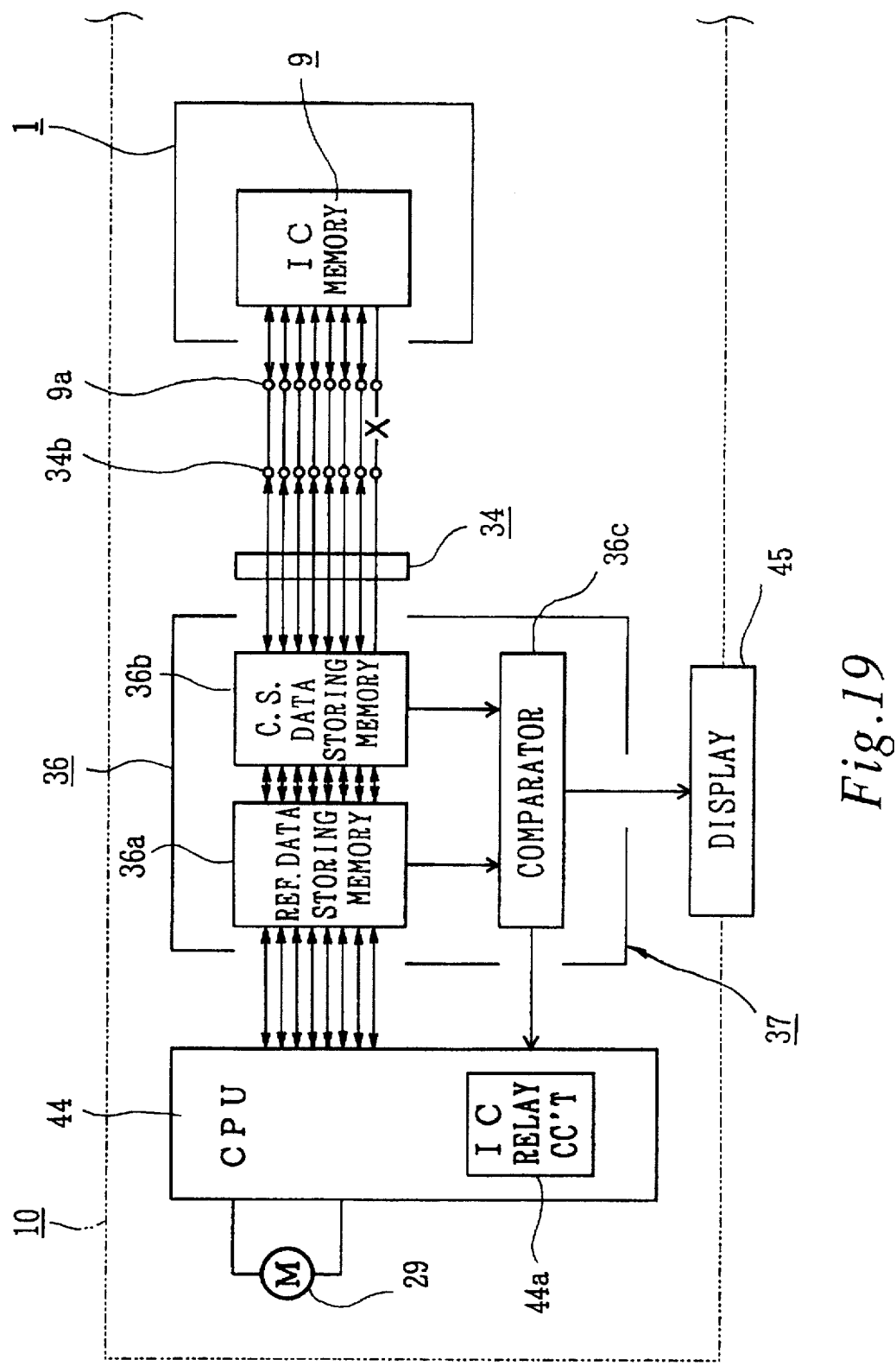
FIG. 19 shows an arrangement of a connecting state judgement device for judging, when electrically conductive contact members of a connector are pressure-contact with connecting terminals of an IC memory, whether or not the electrical connection is reliable.

FIG. 17 is a perspective view showing an IC connecting device and system for a tape cassette mounted with an IC memory package according to the present invention. FIG. 18 is a perspective view showing, in an enlarged scale, a main portion of the IC connecting device shown in FIG. 17. FIG. 19 shows connecting state judgement system for judging a correct electrical connection when connecting terminals of the IC memory are in pressure-contact with electrically conductive pressure contact members (referred to as a pressure contact member) of a connector, and FIGS. 20 to 23 are right side views of the IC connecting device and system of the tape cassette mounted with an IC memory package according to the present invention for explaining an operation of the IC connecting device and the system.

Referring to FIG. 17, in the IC connecting device and system for a tape cassette mounted with the IC memory package according to the present invention, a tape cassette 1 used for the IC connecting device is constituted with a casing 2 accommodating a magnetic tape 3 and an IC memory package (referred to as IC memory hereafter) 9 which has IC memory elements therein and is provided with a plurality of terminals 9a and mounted on an outer wall 2a of the casing 2, and the terminals 9a are electrically connected to a connector 34 of the IC connecting device having a plurality of electrically conductive pressure-contact members 34b and being provided on the side of a recording and reproducing apparatus 10. The IC connecting device is electrically and reliably connected to a plurality of connecting terminals 9a of the IC memory 9 when the tape cassette 1 is loaded in a predetermined position in the recording and reproducing apparatus 10.

The tape cassette 1 having the casing 2, which is to be used in this embodiment, is one which accommodating the magnetic tape 3 as mentioned, although this invention is also applicable to a disc case having a casing 2 accommodating a disc (not shown), on the outer wall 2a of which the IC memory 9 is mounted.

Before describing the IC connecting device and system for a tape cassette mounted with the IC memory according to the present invention, the tape cassette 1 having the casing 2 in which the magnetic tape 3 is accommodated will be described with reference to FIG. 17.

In the casing 2 of the tape cassette 1, a pair of supply and take-up reels 4a and 4b on which the magnetic tape 3 is wound are accommodated. The magnetic tape 3 wound on the supply reel 4a is threaded through a supply side guide pole 5 provided in front of the casing 2, along a rear surface a front lid 6 rotatably provided on the casing and through a take-up side guide pole 7 and is taken up on the take-up reel 4b.

A label 8 for indication of a program content recorded on the magnetic tape 3 may be attached to an outer surface 2a of a rear wall of the casing 2 which is opposite to the front lid 6 with a fixed distance.

An IC memory 9 having a plurality of exposed connecting terminals 9a is mounted on the outer surface 2a of the rear wall of the casing 2.

The IC memory 9 is a non-volatile memory such as EPROM and constitutes a main portion of the present invention. The IC memory is used, in recording an image information and/or audio information on the magnetic tape 3, to store an information related to the image and/or audio information, including, for example, recording date, title, header position, recording time and residual time.

The recording and reproducing apparatus 10 is mainly composed of a recording medium transportation device 20 for transporting the tape cassette 1 from an inserting position to a predetermined cassette loaded position, an IC connecting device 30 for electrically connecting the connecting terminals 9a of the IC memory 9 mounted on a predetermined position of the casing 2 of the tape cassette 1 to the side of the recording and reproducing apparatus 10, a connecting state judgement device 37 for judging an electrical connection between the connecting terminals 9a of the IC memory 9 and a plurality of contacts 34b of a connector 34, a connecting state display 45 (FIG. 19) for displaying a result of judgement and a recording and reproducing device 40 for recording and reproducing the information with respect to the magnetic tape 3 within the tape cassette 1.

In detail, the recording and reproducing apparatus 10 includes a base 11 in the form of a chassis. The chassis 11 includes a bottom plate portion 11a and parallel side plate portions 11b and 11c provided on both sides of the bottom plate portion 11a.

The side plate portion 11b is formed with inverted L shaped three parallel guide slots 11b1–11b3 and the side plate portion 11c is formed with inverted L shape three parallel guide slots 11c–11c3. In FIG. 17, the guide slot 11c1 of the side plate portion 11c is not shown. The guide slots 11b1–11b3 of the side plate portion 11b are symmetrical with respect to the guide slots 11c–11c3 of the side plate portion 11c, respectively, so that the tape cassette 1 mounted on a cassette holder 21 of the recording medium transporting device 20, which is to be described, can be guided therealong between the inserting position and the predetermined loaded position.

The cassette holder 21 has a rectangular open-box shape defined by a bottom plate portion 21a, side plate portions 21b and 21c and a top plate portion 21d with a front opening 21e for accepting and guiding the tape cassette 1 and a rear opening 21f for guiding the magnetic tape 3 in the tape cassette 1.

Guide pins 21b1–21b3 and 21c1–21c3 are implanted on outer surfaces of the side plate portions 21b and 21c, respectively, and fitted in the guide slots 11b1–11b3 and 11c–11c3 of the side plate portions 11b and 11c of the chassis 11, respectively. In FIG. 17, the guide pin 21c3 is not shown.

A shaft 22 is provided below the front opening 21e of the cassette holder 21 and rotatably supported by the side plate portions 11b and 11c, with opposite ends of the shaft 22 being protruded outwardly from the respective side plate portions 11b and 11c.

Root portions of a pair of fork arms 23 and 24 are fixed on opposite end portions of the shaft 22 such that the fork arms are positioned outside of the side plate portions 11b and 11c of the chassis 11, respectively, and partial gears 25 and 26 are fixed to outside faces of the fork arms 23 and 24, respectively.

The fork arms 23 and 24 have fork portions 23a and 24a, respectively, and the guide pins 21b1 and 21c1 of the cassette holder 21, which are received in the guide grooves 11b1 and 11cd of the side plate portions 11b and 11c of the chassis 11, are received in slots of the fork portions 23a and 24a, respectively.

Since the mechanisms around the side plate portions are symmetrical, only the right side mechanism will be described. On a portion of the shaft 22, a torsion spring 27 is provided between the fork arm 23 and the partial gear 25, with one end of the torsion spring 27 being engaged with the fork arm 23 and the other end thereof being engaged with the partial gear 25, such that the fork arm 23 is biased thereby in a clockwise direction (shown by an arrow A1) about the shaft 22. The root portion of the fork arm 23 is provided with outwardly protruding pins 23b and 23c (FIG. 18) which are loosely fitted in arcuate slots 25a and 25b formed in the partial gear 25, respectively.

Therefore, the fork arm 23, together with the partial gear 23 fixed on the shaft 22, can rotates around the shaft 22 when the pins 23b and 23c of the fork arm 23 biased clockwisely by the torsion spring 27 reaches extreme ends of the arcuate slots 25a and 25b of the partial gear 25 and, thus, the cassette holder 21 can be moved from the cassette accepting position which is an upper front position to the predetermined cassette loaded position which is a lower end position with the guide pins 21b1 and 21c1 of the cassette holder 21 being driven in the fork portions 23a and 24b of the fork arms 23 and 24, respectively. When the cassette holder 21 reaches the cassette loaded position, the pins 23b and 23c of the fork arm 23 can move within the arcuate slots 25a and 25b of the partial gear 25 and, thus, only the partial gear 25 fixed on the shaft 22 can further move together with the shaft 22.

The partial gear 25 meshes with another partial gear 28a which is connected to a motor 29 through a reduction gears including a spur gear 28b formed integrally with the partial gear 28a.

The IC connecting device 30 which is a main portion of the present invention will be described with reference to FIGS. 17 and 18.

The IC connecting device 30 is provided such that a connector 34 having a pressure contact member 34b and being provided on the side of the recording and reproducing apparatus 10, is connected to and disconnected from, through a plurality of connecting terminals 9a, the IC memory 9 mounted on an outer rear surface 2a of the casing 2 in coordination with the movement of the cassette holder 21 of the recording medium transporting device.

That is, a generally L-shaped connector support arm 31 is rotatably supported on the shaft 22 which rotates together with the fork arms 23 and 24 and the partial gears 25 and 26 for moving the cassette holder 21 from the cassette accepting position to the predetermined loaded position, substantially correspondingly to the position of the IC memory 9 on the tape cassette 1.

The connector support arm 31 on the shaft 22 includes a horizontal portion 31a and a vertical portion 31b on which a connector 34 is mounted for IC connection. The connector support arm 31 is rotatably mounted on the shaft 22 with E-shaped washers 32 disposed on both sides of the horizontal portion 31a of the connector support arm 31. A torsion spring 33 is provided on the shaft 22 with one end thereof being engaged with the horizontal portion 31a of the connector support arm 31 and the other end being engaged with a bent-up portion 11a1 formed by bending up a bottom plate portion 11a of the chassis 11, so that the connector support arm 31 on the shaft 22 is biased counterclockwise direction (shown by an arrow A2).

The connector 34 mounted on the vertical portion 31b of the connector support arm 31 has a generally rectangular base portion 34a of electrically insulating resin material and a plurality of pressure contact members 34b in the form of, for example, metal leaf springs embeded in the base portion 34a. One end of each of the electrically conductive pressure contact members 34b protrudes from the base portion 34a so that they can elastically contact with the connecting terminals 9a of the IC memory 9 and the other end of thereof is electrically connected to an IC drive circuit 36 and a CPU 44 in the recording and reproducing apparatus through a wire 35.

Since the connector 34 mounted on the vertical portion 31b of the connector support arm 31 is positioned eccentrically with respect to the shaft 22 which acts as a rotation center, one ends of the electrically conductive pressure contact members 34b of the connector 34 can be in pressure-contact with the connecting terminals 9a of the IC memory 9 by sliding upwardly on the connecting terminals 9a when the connector support arm 31 rotates in clockwise direction (shown by the arrow A1) around the shaft 22. Therefore, even if the pressure contact members 34b and/or the connecting terminals 9a are contaminated with dust or stain, the contact members 34b can be reliably in contact with the connecting terminals 9a since dust or stain is removed by their sliding movement against the terminals 9a.

A contact arm 47 which has a contact portion 47a extending under a bottom surface 31a1 of the horizontal portion 31a of the connector support arm 31 is fixed on the shaft 22 in the vicinity of the connector support arm 31.

When the contact portion 47a is positioned remote from the bottom surface 31a1, the connector support arm 31 biased by the torsion spring 33 in the counterclockwise direction (shown by the arrow A2) rests on the bottom plate portion 11a of the chassis 11. In this case, since the tape cassette 1 mounted on the cassette holder 21 is not in the predetermined loaded position as yet, the connector 34 mounted on the vertical portion 31b of the connector support arm 31 is separated from the IC memory 9 mounted on the tape cassette 1.

On the other hand, in response to the downward movement of the cassette holder 21 to the predetermined loaded position, the shaft 22 is rotated clockwise and the contact portion 47a of the contact arm 47 driven by the shaft 22 contacts with the bottom surface 31a1 of the horizontal portion 31a and pushes it up. As a result, the connector support arm 31 is rotated against the torsion spring 33 in clockwise direction (shown by the arrow A1) to an upright position. Upon the tape cassette 1 reaches the predetermined loaded position, the pressure contact members 34b of the connector 34 make an elastic pressure contact with the connecting terminals 9a of the IC memory 9.

A connecting state judgement device 37 and a connecting state display device 45 which constitute a main portion of the present invention will be described with reference to FIGS. 18 and 19.

The connecting state judgement device 37 and the connecting state display device 45 are constituted such that, when the cassette holder 21 reaches the predetermined loading position and the pressure contact members 34b of the connector 34 mounted on the connector support arm 31 are in elastic contact with the connecting terminals 9a of the IC memory 9, the connection between the contact members 34b and the connecting terminals 9a is checked and displayed on an external portion of the recording and reproducing apparatus and, when the check indicates that the electrical connection is not reliable, the fork arm 23 backs up slightly together with the contact arm 47 to make its contact portion 47a retracting from the bottom surface 31a1 to separate the contact member 34b from the terminals 9a, the pressure contact operation is repeated automatically until the electrical connection therebetween becomes reliable.

That is, the connecting state judgement device 37 provided in the recording and reproducing apparatus 10 is constituted with an IC relay circuit 36 and a CPU 44.

The CPU 44 preliminarily stores reference data corresponding to the connecting terminals 9a of the IC memory 9. For example, when the number of the connecting terminals 9a is 8 as shown in the figures, the CPU 44 stores, for example, (11111111) as the reference data. The reference data in the CPU 44 are transferred to a reference data storing memory 36a of the IC relay circuit 36. The reference data stored in the reference data storing memory 36a are further transferred to the IC memory 9 through a connecting state data storing memory 36b of the IC relay circuit 36 and the contact members 34b of the connector 34 which is connected to the connecting state data storing memory 36b and the connecting terminals 9a, so that the reference data are temporarily stored in the IC memory 9.

After the contacting state data storing memory 36b is cleared completely to zero, the reference data temporarily stored in the IC memory 9 are read out and transferred to the contacting state data storing memory 36b and stored therein as the connecting state data through the connecting terminals 9a of the IC memory 9 and the contact members 34b of the connector 34.

Thereafter, the reference data stored in the reference data storing memory 36a are compared with the connecting state data stored in the connecting state data storing memory 36b by a comparator 36c of the IC relay circuit 36.

Assuming that a result of the comparison made in the comparator 36c indicates that there is no faulty connection at the contact member 34b, that is a faulty connection such as indicated by "x" in FIG. 19 is not present, the reference data of (11111111) stored in the memory 36a should coincide with the connecting state data derived data read out from the IC memory 9 and stored in the connecting state data storing memory 36b. This agreement determined to be reliable electrical connection established between the connecting terminals 9a of the IC memory 9 and the contact members 34b of the connector 34. In this case, an instruction signal for making the IC drive circuit 44a operable is supplied from the comparator 36c to the IC device circuit 44a so that the IC memory 9 is made becomes operable. Further, a "reliable" connection is displayed on a display 45 provided in the external portion of the recording and reproducing apparatus 10 according to the instruction signal.

On the other hand, when the comparison made in the comparator 36c indicates that there is a fault connection "x" at a contact member 34b as shown in FIG. 19, the reference data stored in the reference data storing memory 36a which are, for example, (11111111) are not in agreement with the connecting state data transferred from the IC memory 9 to the connecting state data storing memory 36b which are (11111110). This state is judged to be unreliable electrical connection between the connecting terminals 9a of the IC memory 9 and the contact members 34b of the connector 34. In this case, an instruction signal for making the IC drive circuit 44a inoperable is supplied from the comparator 36c to the IC drive circuit 44a, so that the IC memory 9 becomes inoperative. Further, an "unreliable" connection is displayed on the display portion 45 provided in the external portion of the recording and reproducing apparatus 10 according to the instruction signal. Further, an instruction for driving the motor 29 is supplied from the comparator 36c to the CPU 44, upon which the fork arm 23 backs up slightly together with the contact arm 47 to make its contact portion 47a retracting from the bottom surface 31a1 to separate the contact members 34b from the terminals 9a. This pressure contact operation is repeated automatically until the electrical connection therebetween becomes "reliable".

In the above mentioned method, the reference data preliminarily stored in the CPU 44 are transferred and stored in the IC memory 9 temporarily and used as the connecting state data by reading them from the IC memory 9. However, it is possible to compare reference data between the IC memory 9 and the CPU 44 by preliminarily storing the same reference data as the reference data of the CPU 44 in the IC memory by a method which is different from the mentioned method.

A front lid opening member 12 for opening the front lid 6 of the tape cassette 1 is provided on a rear portion of the side plate portion 11c of the chassis 11 in a midway of the path of the tape cassette 1 to the predetermined loaded position and a positioning pin 13 for positioning the tape cassette 1 in the predetermined loaded position and a recording and reproducing device 40 for recording when the tape cassette 1 reaches the loaded position and reproducing the magnetic tape 3 in the tape cassette 1 are provided on the bottom plate portion 11a of the chassis 11.

The recording and reproducing device 40 is constituted with an upper drum 42 which rotates together with a rotary magnetic head 41, a lower drum 43 on which a lead portion 43a for guiding the magnetic tape 3 helically is formed and a capstan and pinch rollers for transporting and guiding the magnetic tape, which are not shown.

An operation of the IC connecting mechanism for the tape cassette mounted with the IC memory package, which has the construction mentioned above, will be described with reference to FIGS. 20 to 23. For simplicity of description, only operation on the right side portion thereof will be described in detail. In FIGS. 20 to 23, reference numerals are attached only to the main portions and therefore FIG. 18 should be referred to for details thereof.

Figure 20:
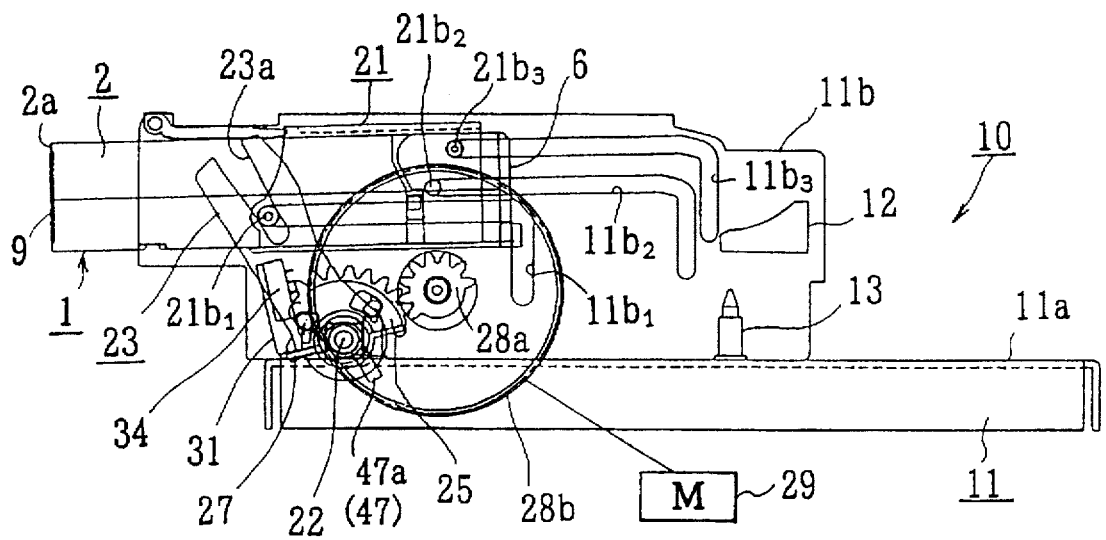
FIG. 20 is a right side view of an IC connecting device and system for a tape cassette mounted with an IC memory according to the present invention for explaining its operation.

FIG. 20 shows a state where the cassette holder 21 is in the cassette accepting position and the recording medium transporting device 20 is stationary in an initial state.

That is, the partial gear 25 fixed on the shaft 22 is stationary and the pins 23b and 23c of the fork arm 23 fitted on the shaft 22 are in contact with one ends of the arcuate slots 25a and 25b of the partial gear 25 while being biased in clockwise direction about the shaft 22 by the torsion spring 27, respectively. The fork arm 23 and the partial gear 25 are rotated in counterclockwise direction about the shaft 22.

Further, since the guide pin 21b1 of the cassette holder 21, which is loosely fitted in the slot of the fork portion 23a of the fork arm 23, is in a forward end of the guide slot 11b1 of the side plate portion 11b of the chassis 11, the cassette holder 21 is in the cassette accepting position. When the tape cassette 1 is inserted into the cassette holder 21 in that position with the front lid 6 of the tape cassette 1 being ahead, the IC memory 9 mounted on the rear surface 2a of the outer wall of the casing 2 is held outside of the cassette holder 21 as shown in FIG. 20.

On the other hand, since, below the cassette holder 21, with the contact portion 47a of the contact arm 47 fixed on the shaft 22 being separated from the bottom surface 31a1 of the connector support arm 31, the connector support arm 31 is rotated in counterclockwise direction about the shaft 22 by the torsion spring 33 causing and the lower end of the vertical portion 31b of the connector support arm 31 to rest on the bottom plate portion 11a of the chassis 11. Therefore, the vertical portion 31b is tilted and hence the connector 34 mounted thereon is also tilted with respect to the surface of the IC memory 9.

Figure 21:
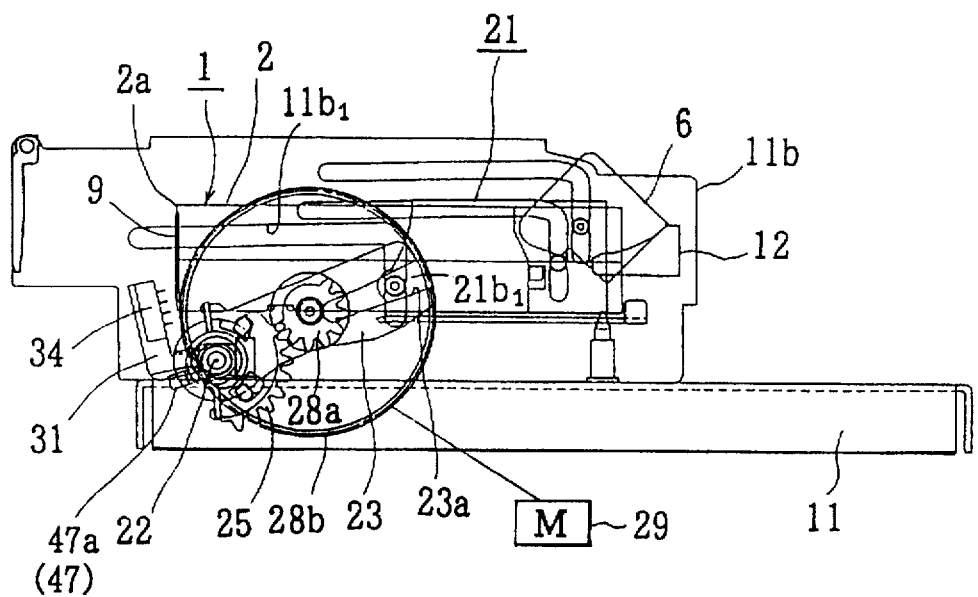
FIG. 21 is a right side view of an IC connecting device and system for a tape cassette mounted with an IC memory according to the present invention for explaining its operation.

Then, when the spur gear 28b and the partial gear 28a are rotated from the state shown in FIG. 20 by the motor 29, the partial gear 25 meshed with the partial gear 28a is rotated together with the fork arm 23 in clockwise direction about the shaft 22. Since, therefore, the guide pin 21b1 of the cassette holder 21, which is loosely fitted in the fork portion 23a, moves downwardly along the vertical portion of the guide slot 11b1 of the side plate portion 11b as shown in FIG. 21, the cassette holder 21 is moved downwardly. With the downward movement of the cassette holder 21, the front lid 6 of the tape cassette 1 is in contact with the the front lid opening member 12 and is opened.

As the tape cassette 1 mounted on the cassette holder 21 is moved down, the IC memory 9 mounted on the rear surface 2a of the outer wall of the casing 2 approaches the connector 34 mounted on the vertical portion 31b of the connector support arm 31. However, since the contact portion 47a of the contact arm 47 is still separated from the bottom surface 31a1 of the connector support arm 31 even when it rotates together with the shaft 22 in clockwise direction, the connector 34 mounted on the vertical portion 31b of the connector support arm 31 is kept tilted and thus it is still separated from the IC memory 9.

Figure 22:
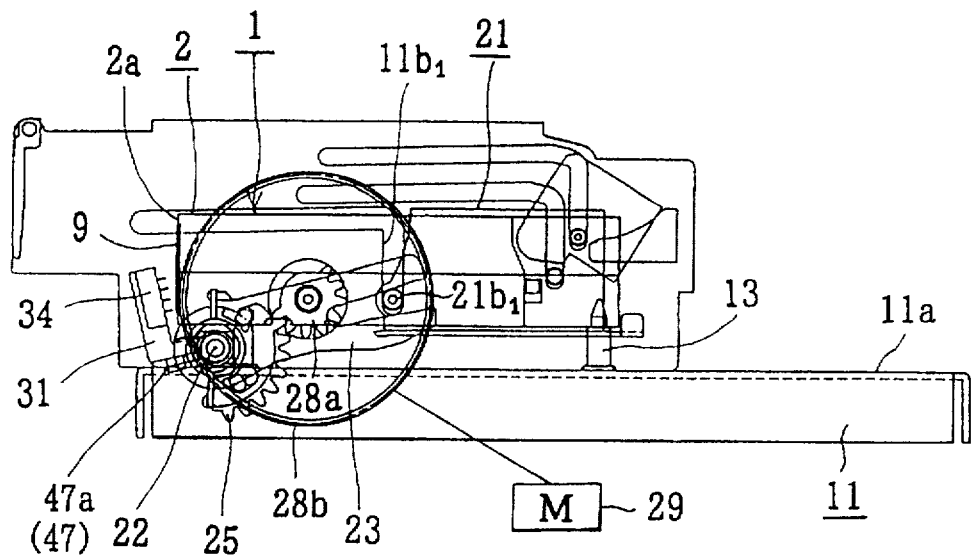
FIG. 22 is a right side view of an IC connecting device and system for a tape cassette mounted with an IC memory according to the present invention for explaining its operation.

Then, when the cassette holder 21 is further moved down as shown in FIG. 22, the tape cassette 1 mounted on the cassette holder 21 is positioned at the positioning pin 13 implanted on the bottom plate portion 11a of the chassis 11 and reaches the predetermined loaded position. In this state, the fork arm 23 and the partial gear 25 have been rotated together with the shaft 22 in clockwise direction. Further, although the contact between the contact portion 47a of the contact arm 47 and the bottom surface 31a1 of the connector support arm 31 is separated, the connector 34 mounted on the connector support arm 31 is still kept tilted and thus it is still separated from the IC memory 9.

Figure 23:
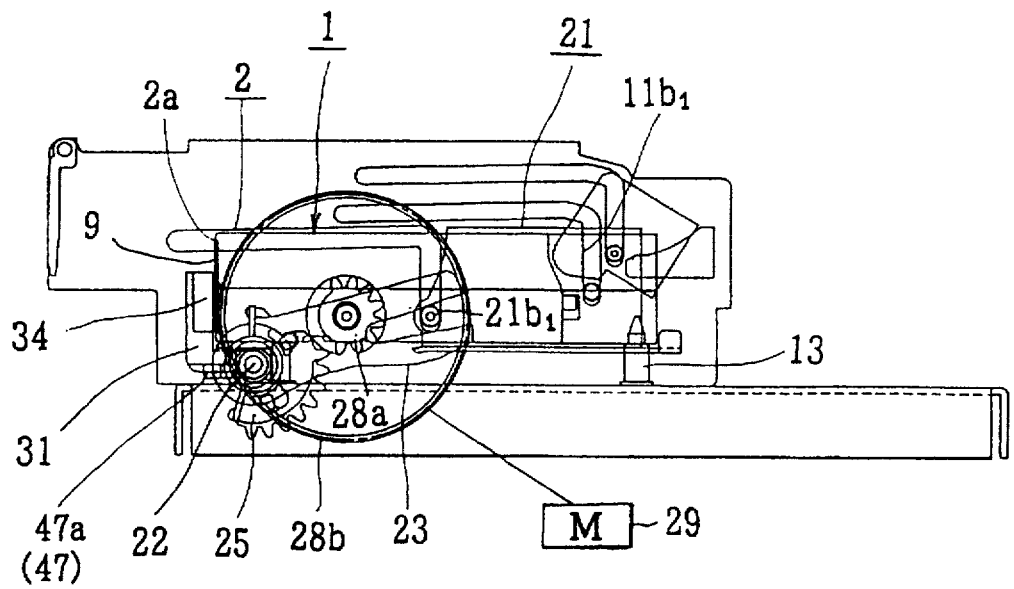
FIG. 23 is a right side view of an IC connecting device and system for a tape cassette mounted with an IC memory according to the present invention for explaining its operation.

When the spur gear 28b and the partial gear 28a are further rotated by the motor 29 from the state in which the tape cassette 1 mounted on the cassette holder 21 is positioned on the positioning pin 13, as shown in FIG. 23, only the partial gear 25 is rotated together with the shaft 22 in clockwise direction. With the rotation of the shaft 22, the contact portion 47a of the contact arm 47 fixed on becomes in contact with the bottom surface 31a1 of the connector support arm 31 and rotates the connector support arm 31 about the shaft 22 in clockwise direction against the torsion spring 33. Therefore, the connector 34 mounted on the vertical portion 31b of the connector support arm 31 is gradually risen vertically, so that the connector 34 opposes to the IC memory 9 mounted on the outer wall of the casing 2 of the tape cassette 1.

In this state, the each exposed end of the electrically conductive pressure contact members 34b 34 slides on and elastically contacts with each of the exposed connecting terminals 9a of the IC memory 9 while removing dust or stain thereon, if any, as mentioned previously, providing a reliable pressure contact therebetween.

When the tape cassette 1 reaches the predetermined loaded position as mentioned above, the connecting terminals 9a of the IC memory 9 mounted on the outer wall of the tape cassette 1 are automatically made in pressure-contact with the respective contact members 34b of the connector 34.

Since, in this state, the pins 23b and 23c of the fork arm 23 can move freely along the respective arcuate slots 25a and 25b of the partial gear 25 to some extent, the fork arm 23 is not rotated and the guide pin 21b1 of the cassette holder 21 loosely fitted in the fork portion 23a is pressed down by the torsion spring 27.

Further, as mentioned previously with reference to FIGS. 18 and 19, when the connecting terminals 9a of the IC memory 9 are made in pressure-contact with the respective contact members 34b, the connecting state judgement device 37 (FIG. 19) judges whether or not the electrical connection therebetween is reliable. When the connecting state judgement device 37 judges the connection as reliable and a "reliable" electrical connection is displayed on the display 45 (FIG. 19) of the recording and reproducing apparatus 10, the IC memory 9 is made operable by the IC drive circuit 44a of the CPU 44.

On the other hand, when a "unreliable" connection is displayed on the display 45, the IC relay circuit 44a of the CPU 44 becomes inoperable and thus the IC memory 9 also becomes inoperable. Further, by retracting the contact arm 47 together with the fork arm 23 reached in the position shown in FIG. 23 to the position shown in FIG. 21 or 22 and then contacting the contact portion 47a of the contact arm 47 with the bottom surface 31a1 of the connector support arm 31 again as shown in FIG. 23, the connecting terminals 9a of the IC memory 9 are again in pressure contact with the respective contact members 34b of the connector 34 and this operation is repeated automatically until the electrical connection therebetween becomes "reliable".

The fork arm 23 may be returned to the state where the cassette holder 21 becomes positioned on the positioning pin 13 as shown in FIG. 22 or to the state before the cassette holder 21 becomes positioned on the positioning pin 13 as shown in FIG. 21.

When the reliable electrical connection is obtained between the connecting terminals 9a of the IC memory 9 and the respective contact members 34a of the connector 34, the IC memory 9 can be driven by the IC relay circuit 44a of the CPU 44 although details thereof are omitted.

A user stores an image information to be recorded on the magnetic tape 3 and an additional information such as audio information including recording date, program title, in the IC memory 9 through the IC relay circuit 44a of the CPU 44.

Therefore, the additional information stored in the IC memory 9 can be read out immediately from the IC memory 9.

In the operation of the IC connecting system applied to the tape cassette mounted with the IC memory package, mentioned above, the connector 34 is made in pressure contact with the terminals 9a of the IC memory 9 mounted on the tape cassette in coordination with the downward movement of the cassette holder 21. When the connector 34 which is in pressure contact with the the terminals 9a of IC memory 9 is to be disconnected therefrom, it is enough to make it in coordination with an upward movement of the cassette holder 21.

Although the IC connecting device 30 has been described as being constructed such that, in coordinated relation to the cassette holder 21 of the recording medium transporting device 20, the connector 34 having the contact members 34b on the side of the recording and reproducing apparatus 10 can be in electrically reliable pressure-contact with the connecting terminals 9a of the IC memory 9 when the tape cassette 1 is loaded in the predetermined loaded position in the recording and reproducing apparatus 10, it is possible to manually repeat the contact when the electrical connection is fund unreliable, by displaying whether or not the connector 34 having the contact members 34b is electrically connected to the connecting terminals 9a of the IC memory 9 mounted on the rear surface 2a of the outer wall of the tape cassette 1 when the tape cassette 1 is manually positioned in the loaded position in the recording and reproducing apparatus 10.

According to an IC connecting device for a recording medium housing mounted with an IC memory package of the present invention, it is possible to pressure-contact a plurality of electrically conductive contact members of a connector provided in the vicinity of a predetermined loaded position with a plurality of connecting terminals of the IC memory when the tape cassette having a casing in which a magnetic tape is accommodated and an IC memory mounted on an outer wall of the casing is positioned in a predetermined loaded position in a recording and reproducing apparatus and to judge whether or not the connecting terminals of the IC memory are electrically reliably connected to the electrically conductive contact members of the connector. Therefore, when any fault contact occurs, it is possible to repeat the contacting operation again and, when the connecting terminals of the IC memory are electrically reliably connected to the electrically conductive contact members of the connector, a user can store an image information to be recorded on the magnetic tape and an additional information such as audio information including recording date, program title, header position, recording time and residual time in the IC memory through the IC drive circuit of the CPU and can retrieve the additional information immediately from the IC memory.

According to another aspect of the present invention, a connector having a plurality of electrically conductive contact members is connected to and disconnected from connecting terminals of an IC memory mounted on an outer wall of a casing of a tape cassette in coordinated relation to a reciprocal movement of a recording medium transporting device of a recording and reproducing apparatus. Therefore, it is possible to automatically pressure-contact the connecting terminals of the IC memory with the electrically conductive contact members of the connector when the tape cassette reaches a predetermined loading position and to automatically repeat the contacting operation until the connecting terminals of the IC memory are electrically reliably connected to the electrically conductive contact members of the connector through the use of a connecting state judgement device.

What is claimed is:

1. A tape cassette for use with a magnetic recording and reproduction apparatus having outer terminal connector means, said tape cassette having a housing with an external surface, a pair of reels rotatably provided in the housing for winding a magnetic tape on said pair of reels, a preventing means provided at a rear side of the housing for preventing the magnetic tape from being erroneously erased, the tape cassette further comprising:

a recess adapted to receive a label indicative of recording contents, said recess being formed on said external surface at a position adjacent to said preventing means, said recess defining a substantially rectangular shape with at least one round corner at a distal end thereof; and an IC memory package having an IC memory built therein capable of indicating a recorded content of the tape cassette in cooperation with the apparatus, the IC memory package comprising a case having a substantially rectangular shape with round corners and indicia means for representing an installed state of the IC memory package when the IC memory package is mounted in the recess, a terminal connector portion electrically connecting said IC memory package to said outer terminal connector means in said apparatus and an adhesive portion provided on a bottom surface of the case affixing said IC memory package entirely upon said external surface of said housing within said recess and in an orientation such that the round corners of the case correspond with the round corners of the recess so as to enable the IC memory package terminal connector portion to make reliable electrical connection to said outer terminal connector means of the apparatus.

2. A tape cassette as defined in claim 1 wherein said indicia means comprises a slanted corner formed in the IC memory package at a corner other than a round corner.

3. A tape cassette for use with a magnetic recording and reproducing apparatus having outer terminal connector means, said tape cassette having a housing with an external surface, a pair of reels rotatably provided in the housing for winding a magnetic tape on said pair of reels, a preventing means provided at a rear side of the housing for preventing the magnetic tape from being erroneously erased, the tape cassette further comprising:

a recess adapted to receive a label indicative of recorded contents, said recess being formed at a position adjacent to said preventing means, a first marker provided on the rear side of the housing nearby the recess; and an IC memory package having an IC memory built therein capable of indicating a recorded content of the tape cassette in cooperation with the apparatus, the IC memory package comprising a case having a substantially rectangular shape, a terminal connector portion electrically connecting said IC memory package to said outer terminal connector means of said apparatus and an adhesive portion provided on the bottom surface of said case affixing said IC memory package entirely upon said external surface of said housing within said recess and a second marker provided on said upper surface of said case in a position other than the terminal portion, wherein the IC memory package is securely adhered in the recess of the said external surface of said housing by causing the second marker of the IC memory package to face the first marker of the housing to readily allow the IC memory package to be oriented in the proper position in the recess such that the terminal connector portion properly connects with the outer terminal connector means of the apparatus.

4. A tape cassette for use with a magnetic recording and reproducing apparatus having outer terminal connector means which includes a power source terminal, said tape cassette having a housing with an external surface, a pair of reels rotatably provided in the housing for winding a magnetic tape on said pair of reels, a preventing means provided at a rear side of the housing for preventing the magnetic tape from being erroneously erased, the tape cassette further comprising:

a recess in said external surface of said housing formed at a position adjacent to said preventing means, said recess defining approximately a substantially rectangular shape; and an IC memory package having an IC memory built therein capable of indicating a recorded content of the tape cassette in cooperation with the apparatus, the IC memory package comprising a case having a substantially rectangular shape, and an adhesive portion provided on a bottom surface of the case mounting said package entirely upon said external surface of said housing, a marker provided at a corner portion of said case representing an installed state of the IC memory package when the IC memory package is mounted in said recess of said external surface, and a terminal portion for electrically connecting said IC memory package to said outer terminal connector means in the apparatus, the terminal portion of the said package comprising an array of terminals provided on an upper surface of said case to readily allow electrical contact with the outer terminal connector means of the apparatus, wherein said array of terminals includes at least a ground terminal aligned such that the ground terminal does not contact the power source terminal of the apparatus when the IC memory package is adhered in an improper orientation in the recess.

* * * * *